Figure 5:
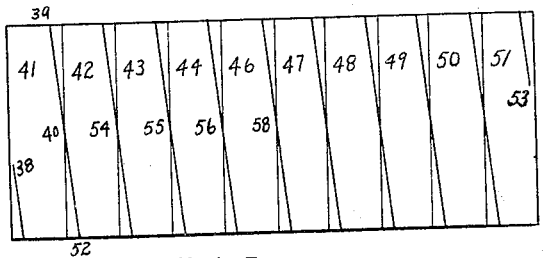

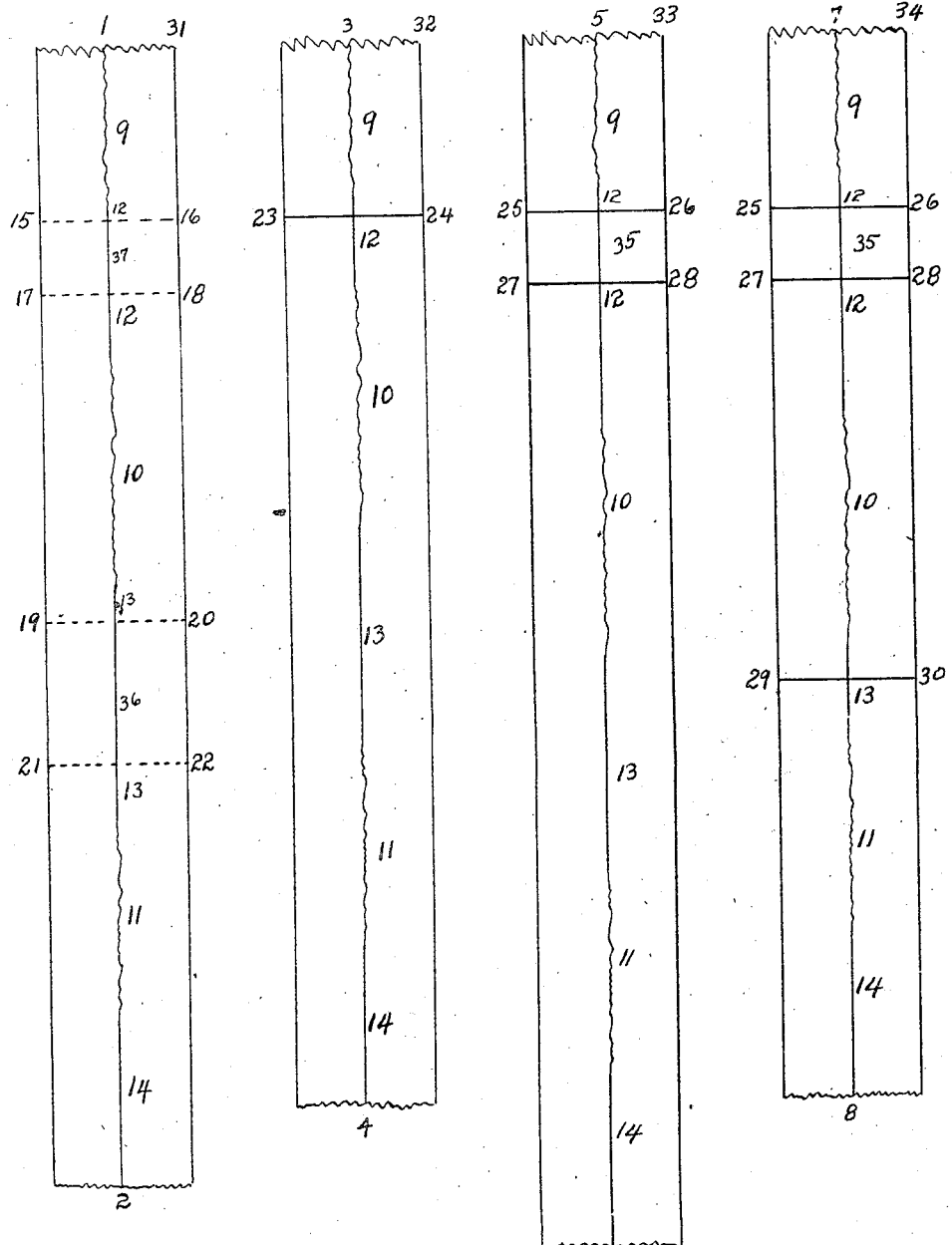

E. S. HOPKINS, Jr.
VIVIGRAPH RECORD AND PROCESS.
APPLICATION FILED FEB. 10, 1909.

1,286,637.

Patented Dec. 3, 1918.
2 SHEETS—SHEET 2.

WITNESSES:
John B Attwell
Gilbert R Larrabee

INVENTOR:
Edwin S. Hopkins Jr.

UNITED STATES PATENT OFFICE.

EDWIN S. HOPKINS, JR., OF NEW YORK, N. Y.

VIVIGRAPH RECORD AND PROCESS.

1,286,637.  Specification of Letters Patent.  Patented Dec. 3, 1918.

Original application filed December 24, 1907, Serial No. 407,895. Divided and this application filed February 10, 1909. Serial No. 477,235.

*To all whom it may concern:*

Be it known that I, EDWIN S. HOPKINS, Jr., a citizen of the United States, residing at New York, in the county of New York and State of New York, have invented new and useful Improvements in Vivigraph Records and Processes, of which the following is a specification.

My invention relates principally to manufactures designed to effect the synchronization, or simultaneous production of selected or analogous optical and acoustical effects, such as the optical effects of the films of motion picture projecting machines and the acoustical effects of phonographs, talking machines or other sound producing or reproducing machine records.

The principal effect is to cause the figures of motion pictures to appear to talk or sing, but other effects are possible, such as the apparent conversation of man and dog, the singing of automatic figures, the dancing of motion picture figures to mechanically produced music, etc.

The principles of my invention are as follows, being illustrated with reference to motion pictures and phonographs, although other optical and acoustical effects are within the scope of my invention.

As is well known, motion pictures are produced by the successive exhibition of individual photographs, and phonographic acoustical effects by variations in a recording medium, generally indentations in a groove, drawn in a plastic substance. It is difficult, and for commercial purposes practically impossible to obtain simultaneously, both motion picture films and phonographic records of a scene, and when the optical record and the acoustical record are made from different scenes, although they may be enacted for the purpose of producing corresponding optical and acoustical records, discrepancies detrimental to perfect synchronism are almost invariably met.

When film and record, advanced at a uniform ratio of speed, are made simultaneously from a scene, the location on the record of acoustical effects corresponding to the individual pictures of the film, will be at corresponding or proportional intervals, but when film and record are made at different times, the locations of the indentations of the record corresponding to the individual pictures of the film, will almost invariably be at irregular, variable or disproportionate intervals.

The main purpose of my invention is to sufficiently or entirely overcome this irregularity, so that when the film and record are suitably advanced at a fixed ratio of speed, the desired effects of synchronism will be obtained.

I find it possible to do this by means which have several forms of application.

In ordinary commercial use, the phonographic records most popular are those in which the indentation groove or track is closely wound in a spiral or helical curve, but to better understand my invention and effect my invention, such a groove is preferably wound in a more widely separated spiral or helical curve or extended in a line on a tape or other form of record.

Ordinarily, the sound groove of the record is considerably longer in physical extent than the corresponding motion picture film. so that it must be advanced at a considerably faster rate of speed, but in the case of a corresponding film and record, when they are begun at a corresponding point, and so advanced at a fixed ratio of speed that they end practically simultaneously, departures from synchronic effect will be caused by the location on the record of the acoustical effects at distances too great or small from the starting point as compared with the location on the film of the corresponding optical effects.

Thus if started at a corresponding point, initial or otherwise, and advanced suitably at a fixed ratio of speed, the effects of the record. if too far from the starting point, will lag or begin to lag behind the corresponding effects of the film. but if too near the starting point. they will precede or begin to precede the corresponding effects of the film. To get the effects into synchronization, it is necessary to bring the locations of the indentations into the order of intervals occupied by the corresponding effects on the film.

This I accomplish by removing from the record, where its effects lag behind or begin to lag behind. a portion of the sound groove or track. thus shortening it to that point. and by inserting in the sound groove or track where its effects precede or begin to precede the corresponding effects of the film, additional extent of groove, thus lengthening it to that point.

The operation, thus of shortening or lengthening, or of shortening and lengthening the record groove to effect synchronization with a film, while it may make the record an imperfect reproduction of the original, will effect the desired synchronism with the film, and is new in the art.

Synchronization could be effected by shortening or lengthening the film instead of the record, which is a more feasible method, but that is claimed in my copending application for Letters Patent, entitled "Vivigraphs" being Serial Number 407,895 filed December 24, 1907, of which this is a division.

In carrying out my invention, I find it generally desirable to employ moving picture and phonographic apparatus in ordinary use and any of the well known methods of causing them to advance at a fixed ratio of speed is sufficient, when the synchronized record herein described is employed.

In carrying out my invention, I find it generally desirable to employ the means herein described, but it is to be understood that in carrying out the objects of my invention, less than all the different mechanisms herein described may be employed for some uses, or parts only may be employed, or other means similar may be employed or substituted, and while the preferred means are indicated, it is to be understood that many of the structural details may be varied and many changes of and in details resorted to, without departing from the scope and spirit of my invention, nor do I limit myself to the particular devices and processes shown, although I believe them to be especially suited to the ends to be attained by my invention.

The operation of changing the length of the groove space is conveniently accomplished in the case of a tape-like record, by removing or inserting lengths, but in the case of a helical groove on a cylinder, it is more conveniently accomplished by removing from or inserting in the cylinder, a disk of the same diameter as the cylinder, and of such thickness as may be requisite for the purpose, preferably of the thickness of, or multiple of one revolution of the helical groove, the periphery of such disk preferably bearing a groove adapted to connect with the ends of the groove of the cylinder.

During the time an individual picture is being exhibited, a certain phonographic groove space will be passed and an additional groove space during the time which elapses between the exhibition of adjacent individual pictures of the film will be passed, which together may be termed a record interval, corresponding to the interval between analogous points of time in the exhibition of adjacent individual pictures of the film. As the operation of removing or inserting spaces in the record is one of great mechanical difficulty, it is generally desirable to perform such operations as infrequently as possible, and when performed, to do so in the blank or soundless parts of the record groove, as in the pauses between words or sentences.

To the trained experimenter, a discrepancy of a twentieth of a second between the optical and acoustical effects is discernible, but to the ordinary observer, a discrepancy of a twelfth of a second will be sufficiently in synchronism to escape notice. Thus when a film is advanced at the rate of sixteen individual pictures per second, a discrepancy of half a record interval in either direction is not noticeable. Therefore, it is generally desirable in correcting the record to synchronize with the film, to effect a correction at such places as the effects are half an interval out, and at such places to remove an entire interval of the record, thus correcting the discrepancy of half an interval in the one direction and introducing a new discrepancy of half an interval in the other direction. By following this method, a very few corrections may suffice to render synchronic an entire record of several minutes' duration.

In the accompanying drawings forming a part hereof, and in which the same reference numerals indicate the same or corresponding parts, Figures 1, 2, 3, 4, 5, 6, 7, 8, 9, 10 and 11 show a form of sound record, the main purpose of which is to produce an effect of synchronism with motion pictures of analogous matter, but in such figures certain details are omitted for the sake of clearness and all the illustrations are purely diagrammatical and do not indicate any specific arrangement.

Fig. 1 represents piece 31, being a portion of a sound record, which may be regarded as seen extended, with a phonic line 1—2 in which line are a series of sound making or reproducing indentations, 9, 10 and 11, with soundless spaces 12, 13 and 14.

Fig. 2 represents piece 32, being the same as piece 31, but with a portion discarded, the discarded portion being represented by dotted lines 15—16; 17—18 of the length of part 37 of soundless space 12. The piece 32 is continuous being joined at 23—24.

Fig. 3 represents piece 33, being the same as piece 31, but with a new portion, 25—26; 27—28 inserted at point represented by the dotted line 15—16.

Fig. 4 represents piece 34, being the same as piece 31 as added to in piece 33, but with a portion discarded, the discarded portion being represented by dotted lines 19—20; 21—22. Piece 34 is continuous being joined at 29—30. The new portion of the phonic line inserted, shown of the length of 35 in soundless space 12, is also shown as being soundless but it may be provided with sound indentations if so desired. Phonic lines 1—2, 3—4, 5—6 and 7—8 are the same except as to length and the relation of their sound making portions to each other. In Fig. 2, sound spaces 9 and 10 are nearer together than in the original, Fig. 1; so that in operation, a smaller interval of time would elapse between sounds made by sound spaces 9 and 10 than in the original. In Fig. 3, sound spaces 9 and 10 are farther apart than in the original and thus in operation, a greater interval of time would elapse between them than in the original. In Fig. 4 the relation of sound spaces 9 and 10 is the same as in Fig. 3, but sound spaces 10 and 11 are nearer together than in the original Fig. 1 by the length of the part 36 of soundless space 13. Thus in piece 34, a greater length of time will elapse between 9 and 10 than in the original and a smaller interval between 10 and 11, and in this particular example, the end of space 11 will be reached on piece 34 prior to the time it would be reached on piece 31, since the discarded part 36 is greater than the inserted part 35. In these figures the direction of movement is presumed to be as from 2 toward 1.

Fig. 5 represents in elevation a cylindrical sound record built up of disks or laminations, 41, 42, 43, 44, 46, 47, 48, 49, 50 and 51. Only portions of the phonic line are illustrated, as from 39 to 52, the line beginning at 38 and proceeding helically around the cylinder and ending at 53 on disk 51. This line or groove is continuous and leaves disk 41 at point 40 to pass onto disk 42, which in turn it leaves at point 54 to pass onto disk 43, being similarly engraved on the remaining disks in order. The disks or laminations may be held together by any convenient means and be of any requisite thickness. Although shown in the illustrations as all being of equal thickness, this is not essential.

Figure 6:
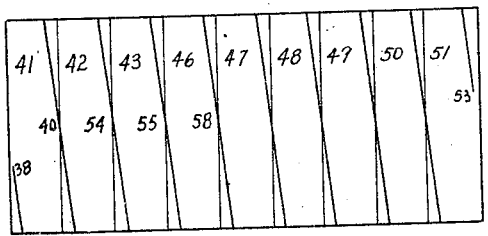

Fig. 6 shows the same record as Fig. 5, but with the helical groove 38—53 shortened by the discarding of disk 44. The groove 38—53 at point 55 where it leaves disk 43, proceeds now to disk 46 instead of disk 44 as in Fig. 5. The effect of discarding disk 44 is thus to shorten the helical groove 38—53 by that part of its length which was taken up on the periphery of disk 44.

Figure 7:
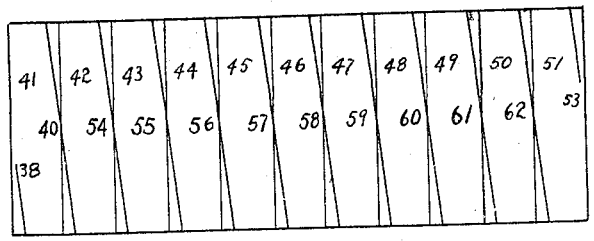

Fig. 7 shows the same record as Fig. 5, but with a new disk or lamination 45 inserted between 44 and 46, the helical groove 38—53 passing from disk 44 at point 56 to disk 45 and from disk 45 at point 57 to disk 46. The helical groove is thus lengthened at the selected point between 44 and 46, by that part of its length which is taken up on the periphery of disk 45.

Figure 8:
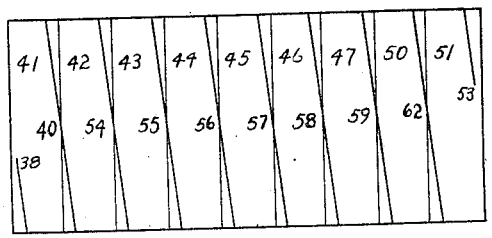

Fig. 8 shows the same record as Fig. 5, with the disk 45 in place as in Fig. 7, but with disks 48 and 49 discarded between 47 and 50; the helical groove 38—53 leaving disk 47 at point 59 and passing to disk 50 instead of, as in Fig. 7 to disk 48. Thus in Fig. 8 the helical groove is lengthened at one point and shortened at another as compared with the unsynchronized original in Fig. 5; the shortening in this example being twice as much as the lengthening, so that the helical phonic line or groove 38—53 is shorter by the length it has on the periphery of one disk in Fig. 8 than in Fig. 5.

Figure 9:
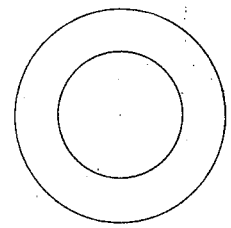
Figure 10:
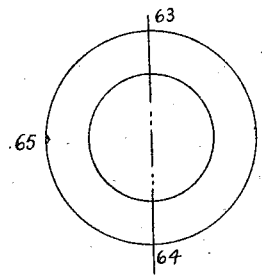
Figure 11:

Fig. 9 shows an end elevation of the record, Fig. 10 an end elevation of one disk with groove entering its periphery at 65, and Fig. 11 shows a cross section of one disk on line 63—64 of Fig. 10, with groove 66—67.

In the examples shown, the disks have all remained in the same angular attitude to each other, that is, no degree of rotation on their axes has occurred, and in such circumstances it is feasible to remove or insert a length of groove equivalent to one convolution; but where fractional portions are desired to be discarded or inserted, the disks may be made thinner with less than a complete convolution or thicker with more than a complete convolution on their peripheries, and their angular attitude proportionately thereto altered, which will have the effect of bringing the points at which the groove should pass from one disk to the next into line.

Having now described certain of the mechanism employed, a more detailed explanation of how the objects of my invention are attained by the means referred to is necessary. The following is a useful procedure within my invention.

The record and the corresponding motion picture film are set in motion in their respective machines arranged to proceed at a suitable ratio of speed. Should the effects of the record show a tendency to forge ahead by the time point 56 is reached, the mechanism may be stopped and a disk inserted, which will prevent for the time being such forging ahead of the effects by giving the motion picture effects time to catch up through the lengthening of the record phonic groove, the end of which will be a greater distance away on account of the insertion of such disk, but thereafter, should the effects of the record lag behind the optical effects of the motion picture, for example at point 59, two disks may be discarded, which will serve to shorten the length of the sound groove, and the ensuing acoustical effects will be more quickly reached, thus securing synchronism with the optical effects which would otherwise have forged ahead and destroyed the synchronism through the failure of the record effects to be reached as early in the process of operation.

Although not illustrated, sound producing machines of various kinds, such as music boxes, piano players, and the like are readily synchronized with motion pictures in the manner indicated by alterations in their sound records. In this description, the simplest and most primary combinations are referred to, one picture machine and one sound machine being considered to be synchronized, but it is to be understood that multiple numbers may be introduced in pursuance of the principles of my invention, as described or by such other means as is herein described which is capable of extension within the scope of my invention.

A number of different means may be employed to advance the film and record at a fixed ratio of speed, which is not necessarily a fixed rate of speed. Indeed it is possible to advance the machines at a varying ratio and varying rate and correct by the means indicated any discrepancies of synchronization. The principles of the invention also apply to other means of producing optical effects similar to motion pictures, such for example as the mutoscope.

The word record as herein used refers to the usual wax-like or composition record used in phonographic sound reproduction, and to such other forms or means of record reproduction which may be employed for the same purposes, including the tape-like form of record.

A tape-like film-record is also within my invention, that is a film bearing a phonic line. Within my invention also is the form of tape-like record which bears no groove with indentations, but which is in the form of a photographic strip, the variations in density of which are employed to reproduce sounds. Chemical phonographs in which electrical deposition occurs are also within the scope of my invention.

What I claim is:

1. An automatically produced record of progressively changing sense phenomena having its distribution of sense effects artificially altered to accord with another analogous record of sense phenomena, substantially as described.

2. A sound record, artificially synchronized with a motion picture film, in which selected portions of the acoustical effects are placed at selected intervals.

3. A sound record, artificially synchronized with a motion picture film, comprising acoustical effects and blank spaces interposed at selected intervals.

4. A sound record artificially synchronized with a motion picture film, comprising acoustical effects between which blank spaces have been interposed at selected intervals and from between which, blank spaces have been omitted at selected intervals.

5. The process of synchronizing a sound record with another sense impression record by artificially modifying the spacing of the acoustical effects thereon.

6. The process of making a sound record synchronous with a motion picture film which includes comprising artificially in its acoustical effects, additional spaces at selected intervals.

7. The process of making a sound record synchronous with a motion picture film which includes artificially removing from its acoustical effects spaces at selected intervals.

8. The process of making a sound record synchronous with a motion picture film which includes comprising artificially in its acoustical effects additional spaces at selected intervals and in the removing artificially from its acoustical effects of spaces at selected intervals.

9. The process of making a sound record synchronous with a motion picture film which consists in artificially cutting out from between its acoustical effects, spaces of selected extent at selected intervals.

10. A laminated cylindrical phonographic record from which certain selected laminations are omitted and certain selected laminations added after recording, the locations of the sound producing portions being thereby redistributed whereby to effect synchronization with a motion picture film of analogous character.

11. The process of making a phonograph record synchronous with a motion picture film of the same analogous subject matter which consists in making a record of a cylindrical shape, of cutting out or omitting from such record at such certain selected spaces groove bearing laminations and inserting in such record at such certain selected spaces groove bearing laminations, as will so redistribute the sound producing portions of the groove as to effect synchronization of its acoustical effects with a motion picture film bearing analogous optical effects.

12. A cylindrical laminated sound record, synchronized with a motion picture film, in which selected portions of the acoustical effects are artificially placed at selected intervals.

13. A cylindrical laminated sound record, synchronized with a motion picture film, comprising acoustical effects between which blank spaces are interposed at selected intervals and from between which blank spaces have been omitted at selected intervals.

14. A cylindrical laminated sound record, synchronized with a motion picture film, comprising in its sound groove, additional spaces at selected intervals.

15. A cylindrical laminated sound record synchronized with a motion picture film, comprising a sound groove from which spaces have been omitted at selected intervals.

16. A cylindrical laminated sound record, synchronized with a motion picture film, comprising laminations bearing acoustical spaces and laminations bearing non-acoustical spaces interposed at selected intervals.

17. A cylindrical laminated sound record, synchronized with a motion picture film, from which laminations bearing acoustical effects have been omitted at selected places.

18. A cylindrical laminated sound record, synchronized with a motion picture film, into which laminations bearing a sound groove containing no acoustical effects have been interposed at selected intervals and from which laminations bearing a sound groove containing no acoustical effects have been omitted at selected places.

19. A cylindrical laminated sound record, synchronized with a motion picture film, into which laminations bearing a sound groove containing no acoustical effects have been interposed at selected intervals and from which laminations containing no acoustical effects have been omitted at selected places and into which laminations bearing a sound groove containing acoustical effects are interposed at selected places and from which laminations bearing a sound groove containing acoustical effects are omitted at selected places.

20. A cylindrical sound record comprising laminations.

21. A cylindrical sound record comprising removable laminations.

22. An automatically produced record of progressively changing acoustical sense phenomena having its distribution of sense effects artificially altered to accord with the corresponding sense effects of an automatically produced record of progressively changing sense phenomena of a different sense, of analogous subject matter, thereby to synchronize them, substantially as described.

EDWIN S. HOPKINS, Jr.

Witnesses:
JOHN B. ATWELL,
EDWARD F. ADAMS.